Jan. 20. 1925.  
M. CURRY ET AL  
1,523,405  
MACHINE FOR USE IN THE MANUFACTURE OF BOBBINS  
Filed July 3, 1923  
5 Sheets-Sheet 1

Inventors  
MALCOLM CURRY.  
ALBERT COOK.  
HENRY J. MARX.  
By their Attorneys

Patented Jan. 20, 1925.

1,523,405

UNITED STATES PATENT OFFICE.

MALCOLM CURRY, OF SCARSDALE, NEW YORK, AND ALBERT COOK AND HENRY J. MARX, OF HOLYOKE, MASSACHUSETTS, ASSIGNORS TO THE AMERICAN THREAD COMPANY, OF NEW YORK, N. Y., A CORPORATION OF NEW JERSEY.

MACHINE FOR USE IN THE MANUFACTURE OF BOBBINS.

Application filed July 3, 1923. Serial No. 649,212.

*To all whom it may concern:*

Be it known that we, MALCOLM CURRY, ALBERT COOK, and HENRY J. MARX, citizens of the United States, residing at Scarsdale, county of Westchester, State of New York; Holyoke, county of Hampden, State of Massachusetts; and Holyoke, county of Hampden, State of Massachusetts, respectively, have invented a certain new and useful Improvement in Machines for Use in the Manufacture of Bobbins, of which the following is a full, clear, and exact description.

Our invention relates to machines for use in the manufacture of bobbins, and has for its principal object to provide a novel and improved machine for forming the heads or flanges of a bobbin and applying them to the bobbin core.

The following is a description of our invention reference being had to the accompanying drawings, in which,—

The machine illustrated in the drawings is particularly adapted for use in the manufacture of paper ended bobbins of the type of the one illustrated and described in the co-pending application of Rex V. Snyder and Malcolm Curry, Serial Number 647,244, filed June 23, 1923 which is provided with a tubular core upon which the thread is wound into a cop, and with end pieces or flanges which before being placed on the ends of the core are dish-shape. They are placed on the core, after the thread has been wound thereon into a cop, and the cop and flanges are then compressed axially and the ends of the core are spread or swedged so as to hold the flanges on the core, the pressing operation flattening the flanges somewhat so as to cause them to more or less yieldingly grip the ends of the cop.

Figure 5:
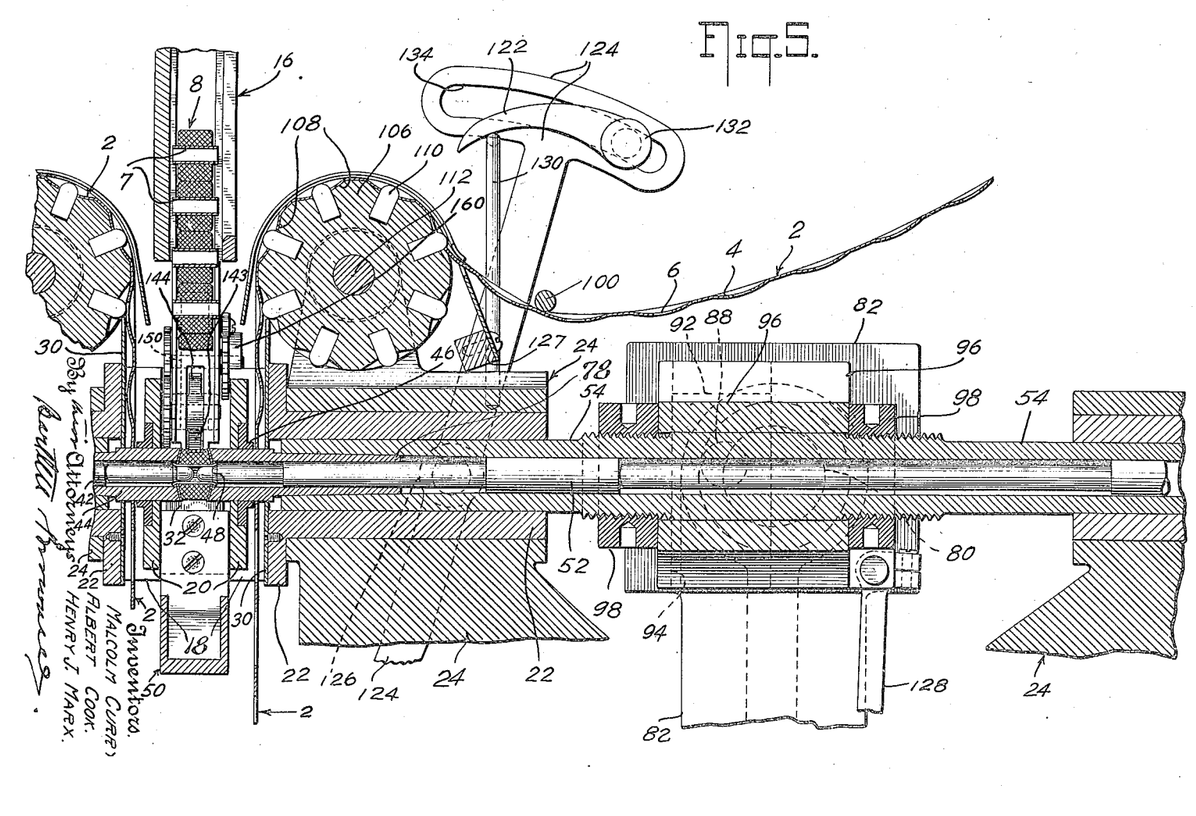
Fig. 5 is a sectional view, on an enlarged scale, taken on the line 5—5 of Fig. 1.
Figure 6:
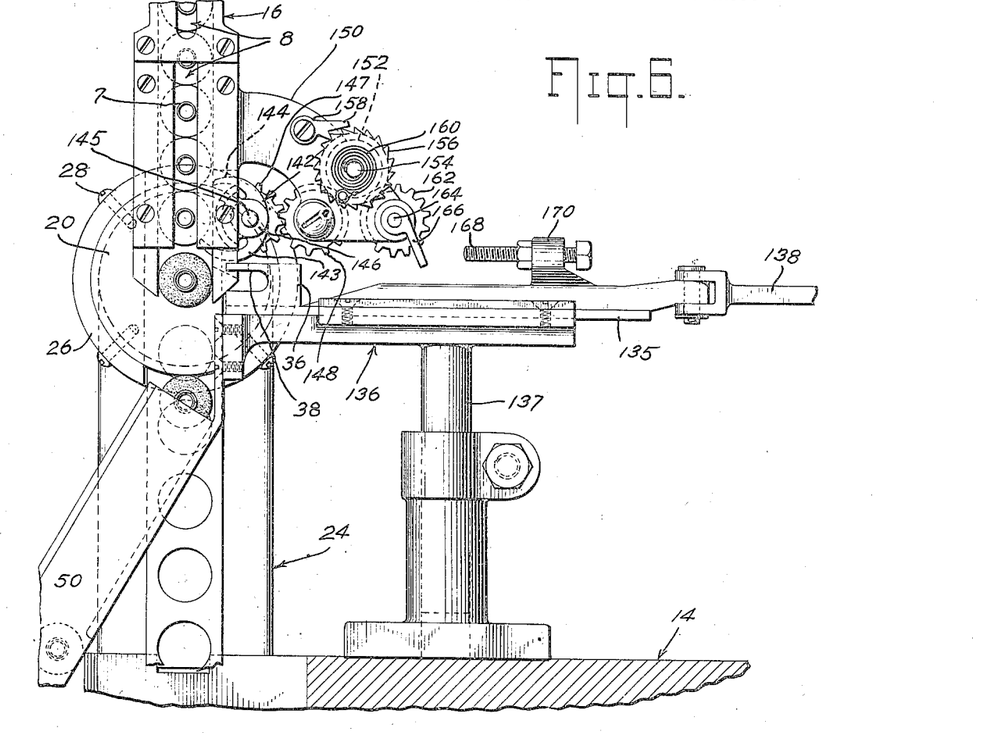
Fig. 6 is a sectional elevation taken substantially on the line 6—6 of Fig. 1.
Figures 7, 8:
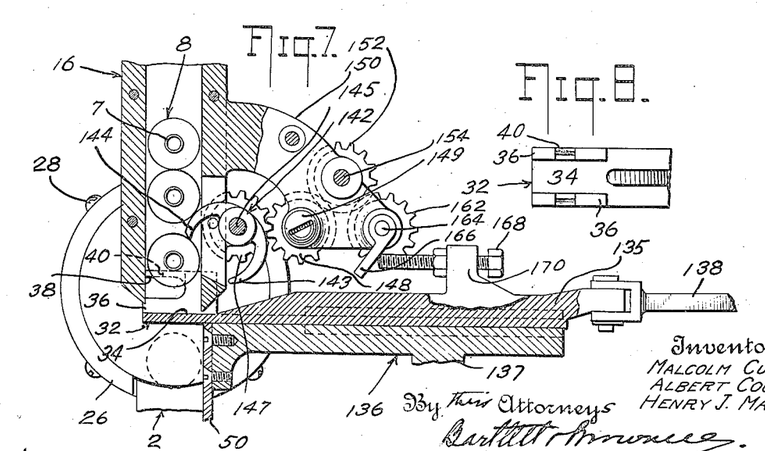
Fig. 7 is a view similar to Fig. 6 but with certain parts shown in a different position and with certain parts shown in section.
Fig. 8 is a detail plan view of a cop supporting member.
Figure 9:
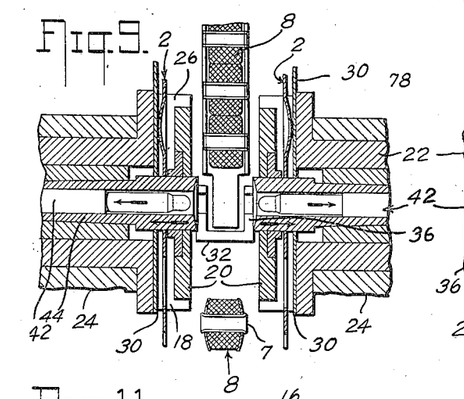
Figs. 9 to 14 inclusive, are sectional views similar to a portion of Fig. 5 illustrating different steps in the operation of the machine, Fig. 5 showing the step following that of Fig. 4 and preceding that of Fig. 9.
Figure 10:
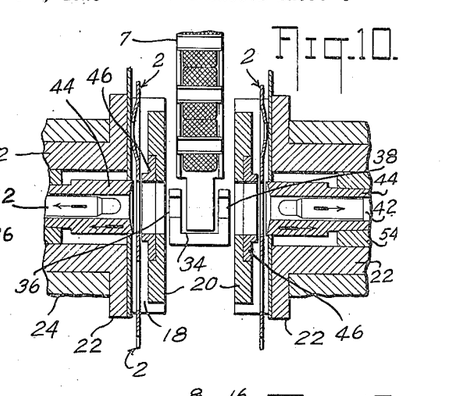
Figure 11:
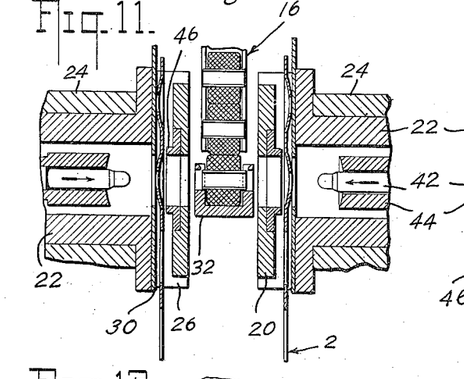
Figure 12:
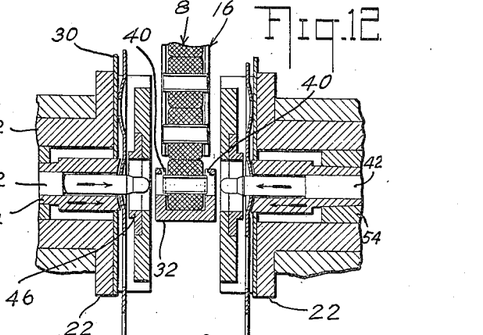
Figure 13:
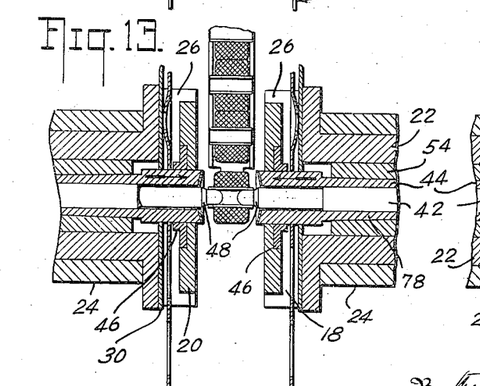
Figure 14:
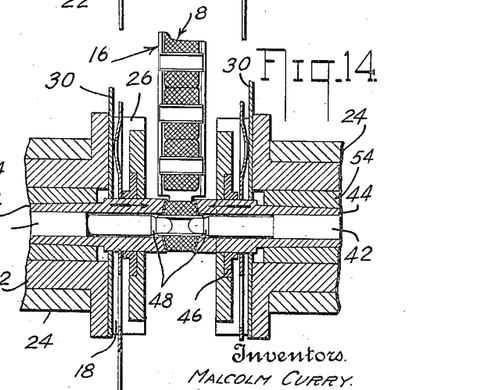

When the present machine is used in forming a bobbin of this type, the stock from which the flanges are formed is supplied to the machine in two strips 2 of paper, each of which is provided with a series of circular bumps or embossed portions 4 of substantially the diameter of the flanges to be formed, and each bump is provided with a central aperture 6 of substantially the diameter of the outside of the core of the bobbin. The cores of the bobbins to be formed are suppled to the machine in the form of cylindrical paper tubes as indicated at 7 having thread already wound thereon so as to form cops 8. The strips 2 are wound on reels 10 which are mounted on the upper ends of brackets 12 that project upwardly from opposite ends of the base plate 14 of the machine. The wound bobbin cores 7 are contained in a vertical magazine or chute 16 that leads from a suitable hopper (not shown), the cores being arranged one above the other in the chute with their axes horizontal. During the operation of the machine the strips are simultaneously drawn from the reels and fed intermittently downwardly through vertical guide-ways 18 that are oppositely disposed and spaced apart substantially at the center of the front of the machine. The guide-ways 18 are formed by vertical diametrically extending grooves in annular blocks 20 which are held against the inner end faces of bushing 22 mounted in bearings on bearing blocks or brackets 24, the blocks 20 being secured to the bushings 22 by means of flanges 26 on the bushings that surround the blocks and are secured thereto by screws 28 (Fig. 6). Guide or stripping plates 30 are secured to the inner end faces of the bushings 22 so as to form the outer walls of the guide-ways, the guide plates projecting a distance above the guide-ways so as to guide the strips into the guide-ways. The strips are fed through the guide-ways intermittently to bring their apertures 6 successively into axial alinement with the bushings 22. As an aperture 6 in the strip is thus brought into axial alinement with the bushings 22 a wound bobbin core is delivered from the magazine and deposited upon a support 32, previously brought into position between the blocks 20, so as to hold the bobbin core in substantially axial alinement with the apertures in the strips and the bushings (Figs. 11 and 12). The support 32 (Figs. 6, 7 and 8) is provided with a horizontal bottom wall 34 and spaced longitudinally extending vertical walls 36 that are provided with forwardly opening horizontal slots 38, and with vertical internal grooves 40 leading into the slots to enable the ends of the bobbin core to clear the vertical walls of the support as the cop is deposited upon the bottom wall of the support. Fig. 9 shows the parts when a bobbin is being discharged at the end of a cycle of operation of the machine. Fig. 10 shows the operating instrumentalities, hereinafter described, partially retracted and the support 32 ready to receive a fresh bobbin from the magazine. Fig. 11 shows the bobbin in position on the support 32 and the operating instrumentalities in further retracted positions. As the bobbin core is thus deposited upon the support 32 (Fig. 11) oppositely disposed mandrels 42 that normally are positioned outside of the strips 2, are moved toward each other through the apertures in the strips and the slots in the side walls of the support and into position to cause their ends to enter the ends of the bobbin core (Figs. 12 and 13). The ends of the mandrels 42 are rounded over and are of a size to fit within the ends of the core so that when they pass through the strips and enter the ends of the core they act to center the bumped portions of the strip and the bobbin. After the ends of the mandrels 42 have entered the ends of the bobbin core the support 32 is retracted, the slots 38 in the vertical side walls of the support permitting the side walls to clear the mandrels. As the support 32 is being retracted, a pair of cutting dies or punches 44 which normally are positioned outside of the strips 2 are advanced toward each other (Figs. 12, 13 and 14) to cooperate with stationary cutting dies 46, mounted on the blocks 20, to cut the strips about the bumps therein so as to form annular pieces and carry the pieces over the ends of the bobbin core and against the ends of the thread cop thereon to form the flanges of the bobbin. These punches 44 constitute plungers and have concave faces which engage the convex surfaces of the bumped or concavo-convex disks and in forcing the disks against the ends of the mass of wound thread compress the mass and give its ends a convex form. The mandrels 42 are then advanced a further predetermined distance toward each other to cause bevelled shoulders 48 thereon to engage the extreme ends of the bobbin core so as to swedge or spread the ends of the core to hold the flanges in position on the core (Fig. 5), which completes the effective operation of the machine in forming a bobbin. At the completion of this operation the cutting punches 44 are retracted from the flanges and the mandrels 42 are retracted out of engagement with the bobbin core permitting the bobbin to drop by gravity into a discharge chute 50, the support 32 advancing at this time to receive the next cop to be delivered from the magazine (Figs. 9 and 10) and the punches and mandrel retracting so as to permit the strips to be fed (Fig. 10).

The mandrels 42 are formed on the inner ends of rods 52 which extend through and are mounted to slide in sleeves 54. The rear ends of the rods 52 are screw-threaded into horizontal slides 56 that are mounted in suitable guideways in brackets 58 on the base plate 14, and are provided with cam rolls 60 which are engaged by grooved-operating cams 62. The cams 62 are carried on the forward end of shafts 64 which extend through and are journaled in bearings 66 on the base plate 14 and are provided at their rear ends with bevel gears 68 which are engaged by bevel gears 70 carried by a driving shaft 72 that extends through and is journaled in bearings 74 on the base plate 14. The driving shaft 72 is driven through a pulley 76 on the left-hand end thereof. The cams 62 have an abrupt rise 63 which moves the plungers so as to produce the core swaging action.

Figure 1:
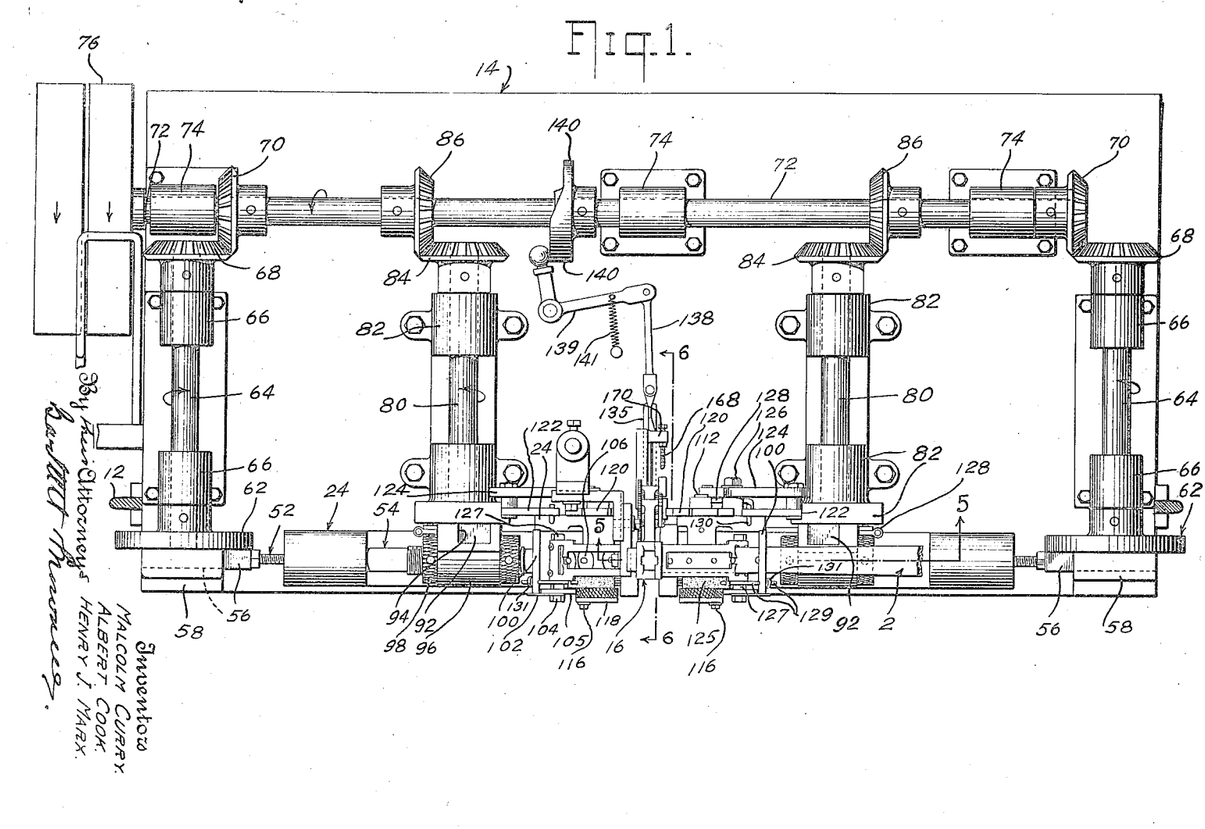
Figure 1 is a plan view, with parts broken away and parts removed, of a machine embodying the features of the invention in their preferred form.
Figures 2, 3, 4:
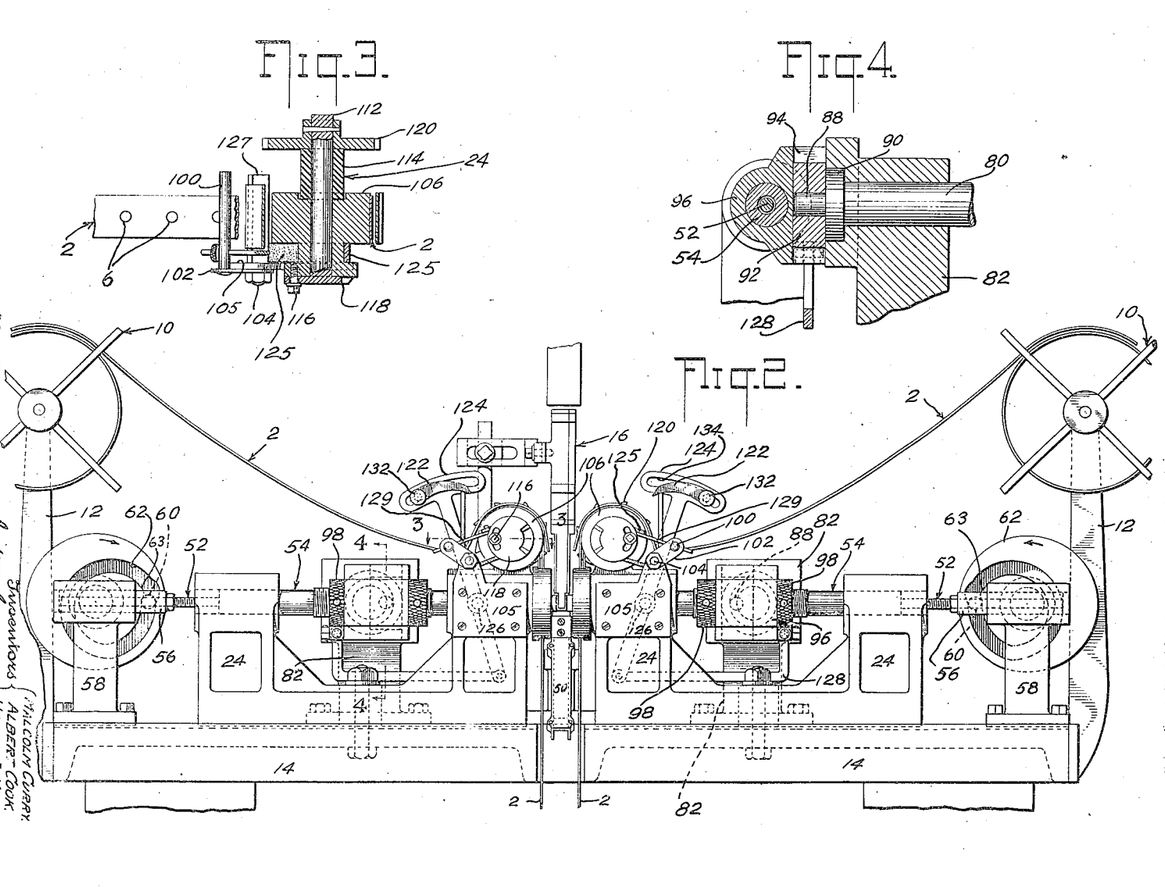
Fig. 2 is a front elevation of the same.
Figs. 3 and 4 are detail sectional views, on an enlarged scale, taken on the lines 3—3 and 4—4, respectively, of Fig. 2.

The cutting punches 44 are provided with tapering shanks 78 that are secured in the inner ends of the sleeves 54. The sleeves 54 are mounted to slide in the bushings 22 and bearings 55 on the blocks or brackets 24, and are actuated to impart the described movements to the cutting punches through connection with shafts 80 that extend through bearings 82 on the base plate 14. The shafts 80 are driven by bevel gears 84 on their rear ends that are engaged by bevel gears 86 carried by the driving shaft 72. The connections between the sleeves 54 and the shafts 80 each comprises a pin 88 (Figs. 4 and 5) eccentrically mounted on a collar 90 formed on the forward end of the shaft which is received in an aperture in a block 92 that is mounted to slide in a vertical groove 94 in a carrier sleeve 96 secured on the sleeve 54 by means of clamping collars or nuts 98 screw-threaded on the sleeve 54 and clamping the ends of the carrier sleeve 96.

The means for guiding and feeding the strips 2 from the reels 10 to the vertical guide-ways 18 comprise horizontal guide pins 100 that are secured in the upper ends of bracket arms 102 having their lower ends mounted on clamping screws 104 extending through apertures in bracket plates 105 secured to the bearing block 24, the bracket arms 102 being mounted on the screws between clamping nuts on the ends of the screws, and the sides of the plates 105, the arms being adapted to be adjusted about the screws to vary the position of the guide pins 100 upon loosing the nuts. The strips 2 pass from the pins 100 over index wheels 106 and then downwardly through the guide-ways 18, the guide or stripping plates 30 of the race-ways extending substantially to the peripheral surfaces of the index wheels so as to serve as guides for the strips as they pass between the index wheels and the race-ways. The peripheral surfaces of the index wheels are provided with a series of equally spaced depressions 108 for receiving the bumps in the strips as the wheels are rotated to feed the strips, and are further provided with radially extending pins 110 having projecting ends that are rounded over for entering the apertures in the strips. The index wheels are mounted on shafts 112 which extend through and are journaled in bearings 114 on the bearing blocks 24. The index wheels are secured to the shafts 112 by means of clamping screws 116 which extend through elongated slots in collars 118, formed on the forward ends of the shaft, and are screw-threaded into the ends of the index wheels. By loosening the clamping screws 116 the angular position of the index wheels with relation to their shafts may be varied as desired. The shafts 112 of the index wheels are intermittently driven to impart the desired intermittent feeding movements to the strips, by means of ratchet wheels 120 secured on their rear ends, the teeth of which are adapted to be engaged by the free ends of pawls 122, the other ends of which are pivotally mounted on the upper ends of oscillating levers 124. The index wheels 106 are held in the position moved by their operating pawls 122 by means of friction straps 125 that frictionally engage the hubs of the index wheels. The straps 125 are secured at one end to horizontal bars 127 secured to the bracket plates 105; and at their outer ends to anchor bolts 129 that extend through apertures in the guide pins 100 and are adjustable longitudinally to tension the straps by means of nuts 131 screw-threaded on their outer ends. The levers 124 are pivotally mounted at 126 on the bearing blocks 24 and are actuated through links 128 connecting their lower ends with the reciprocating carrier sleeves 96. The actuating pawls 122 engage the teeth of the ratchet wheels 120 during the latter part of their advancing movement, and are held from dropping by gravity during their retracting movement by the engagement of their under surfaces with guide pins 130 secured to the bearing blocks 24. The pawls 122 are pivotally mounted on screws 132 which extend through elongated slots 134 in the upper ends of the levers 124 and are adjustable longitudinally of the slots so as to enable the point of contact of the pawls 122 with the teeth of the ratchet wheels to be varied as desired, the slots 134 being concentric with the pivots of the levers 124.

The cop support 32 is formed on the forward end of a horizontal sliding carrier 135 (Figs. 1, 6, 7 and 8) which is mounted to slide in a suitable guide-way in a supporting platform 136 formed upon the upper end of a vertically adjustable post 137 mounted on the base plate. The carrier 135 is reciprocated to impart the required movements to the support 32, as above described, through a link 138 connecting the rear end of the carrier with one arm of a bell-crank 139 having the free end of its other arm arranged to be engaged by an operating cam 140 carried by the driving shaft 72, the bell-crank being held in engagement with the surface of the cam 140 by a coiled spring 141 having one end connected with the bell-crank and its other end secured to the base plate 14.

The mechanism for delivering the cops from the magazine and depositing them upon the support 32 in proper timed relation, as above described, comprises an oscillating detachment or delivering device 142 which is provided with a curved holding member 143 on its lower end which, when the device 142 is in the position shown in Fig. 6 by engagement with the under side of the lowermost cop, acts to hold up the column of cops in the magazine; and is further provided with a discharging or kicking member 144 at its upper end which is held out of the path of the column of cops at this time. When the delivering device 142 is turned in a counter-clockwise direction from the position shown in said Fig. 6 which occurs when the support 32 is moved into position to receive a cop from the magazine, the holding member 143 is moved out of engagement with the lowermost cop, permitting the core to drop down upon the support 32, (Fig. 7), the kicking member 144 of the delivering device advancing so as to strike the lowermost cop in case it fails to drop immediately upon the support 32. During the retraction of the support 32 the delivering device 142 is turned in a clockwise direction so as to bring its holding end 143 into position to engage the lowermost cop and thus hold the column of cops away from the cop that is being operated upon. The delivering device 142 is secured on a short shaft 145 which extends through and is journaled in bearings in two ears 146 projecting from opposite sides of the race-way. A gear 147 is secured to one end of the shaft 145 and engages an idle gear 148 mounted on a shaft 149 which is journaled in a bracket arm 150 projecting rearwardly from the race-way. The idle gear 148 is engaged by a gear 152 secured on one end of a shaft 154 which extends through and is journaled in a bearing in the bracket arm 150. A ratchet wheel 156 is loosely mounted on the other end of the shaft 154, the teeth of which are engaged by a holding pawl 158 that holds the ratchet wheel from rotation in a counter-clockwise direction. A spiral spring 160 is coiled about the end of the shaft 154 projecting beyond the end of the ratchet wheel 156 and has one end secured to the shaft and its other end secured to the ratchet wheel, the spring being so coiled as to tend to turn the shaft 154 in a clockwise direction, and, through the described connections with the delivering device 142, turn the delivering device in a direction to bring its holding member 143 into engagement with the lowermost cop in the magazine, as above described. The gear 152 on the shaft 154 is engaged by a gear 162 on one end of a shaft 164 which extends through and is journaled in a bearing in the bracket arm 150. The other end of the shaft 164 is provided with a depending arm 166, the lower end of which is positioned in the path of a horizontal abutment screw 168 which is screw-threaded through a lug 170 formed on the sliding carrier 135. With this construction it will be apparent that upon the advancing movement of the sliding carrier 135 to bring the support 32 into position to receive a cop from the magazine that the abutment screw 168 will turn the arm 166 in a clockwise direction which, through the connecting mechanism, will turn the delivering device 142 in a direction to deliver a cop upon the support 32, and that during the retracting movement of the sliding carrier 135 the spiral spring 160 will act through the connecting mechanism to return the delivering device to its effective holding position.

From the foregoing it will be apparent that the machine is of simple construction, and operates entirely automatically with precision and accuracy to cut pieces from the bumped strips and apply them to the ends of the bobbin cores to form the flanges of the bobbins, and to spread or swedge the ends of the bobbin cores to hold the flanges in place after which the bobbins thus formed are discharged from the machine ready for the subsequent pressing and final swedging operation.

As will be evident to those skilled in the art our inventions permit of various modifications without departing from the spirit thereof or the scope of the appended claims.

What we claim is:

1. A machine for use in the manufacture of bobbins having, in combination, a support for a cop comprising a core and a mass of thread wound thereon, means for supporting two strips adjacent to opposite ends of the core of a cop held by said support, and means comprising cutting dies for cutting pieces from the strips and applying them to the ends of the core to form the flanges of the bobbin, each piece having a central aperture and being applied by forcing it over the end of the core.

2. A machine for use in the manufacture of bobbins having, in combination, a support for a cop comprising a core and a mass of thread wound thereon, concave faced plungers for compressing and shaping said mass and for forcing perforated concavo-convex disks over the ends of the core and against the ends of said mass, and means for swaging the ends of the core after the disks are applied so as to hold them on the core and against the ends of said mass.

3. A machine for use in the manufacture of bobbins having, in combination, a pair of centering mandrels spaced apart and arranged in axial alinement, means for positioning a cop comprising a tubular core and a mass of thread wound thereon between and substantially in alinement with said mandrels, means for moving the mandrels toward each other to cause their ends to enter the ends of the core so as to center and hold the core, and means for applying suitable pieces of material to the ends of the core to form the flanges of the bobbin while the core is being thus held, each piece having a central aperture and being applied by forcing it over the end of the core.

4. A machine for use in the manufacture of bobbins having, in combination, a support for a cop comprising a core and a mass of thread wound thereon, means for supporting a strip adjacent to one end of a cop held by said support, means comprising cutting dies for cutting a piece from the strip and applying it to said end of the core to form the flange of the bobbin, and means for swedging said end of the core when said piece is applied so as to hold it on the core.

5. A machine for use in the manufacture of bobbins having, in combination, a pair of mandrels spaced apart and arranged in axial alinement and capable when moved toward each other to a predetermined position to enter the ends of a tubular core surrounded by a mass of thread and placed in axial alinement between them to center and hold the core, and when moved toward each other a predetermined distance from said position to swedge the ends of the core, means for applying suitable pieces of material to the ends of the core to form the flanges of the bobbin when the core is thus held by the mandrels, and means for operating the mandrels to thus center and hold the core and when said pieces have been applied to swedge the ends of the core to hold the pieces thereon.

6. A machine for use in the manufacture of bobbins having, in combination, a pair of mandrels spaced apart, arranged in axial alinement and capable when moved toward each other to a predetermined position to enter the ends of a tubular core surrounded by a mass of thread and placed in axial alinement between them so as to center and hold the core and when further moved toward each other a predetermined distance to swedge the ends of the core, means for positioning the tubular core between and in axial alinement with said mandrels when the mandrels are in retracted position, means for supporting two strips adjacent to opposite ends of the core, each strip having a circular aperture of substantially the diameter of the outside of the core and arranged in axial alinement with the core, means comprising a pair of cutting dies surrounding said mandrels for cutting the strips about said apertures to form annular pieces and for then applying the pieces to the core to form the flanges of the bobbin, and means for operating the mandrels to center and hold the core previous to the application of said pieces of material and to swedge the ends of the core after said pieces are applied.

7. A machine for use in the manufacture of bobbins having, in combination, a support for a cop comprising a core and a mass of thread thereon, means for supporting a strip adjacent to one end of a cop held by said support, said strip having a circular aperture of substantially the diameter of the outside of the core and arranged in axial alinement therewith, means comprising cutting dies for cutting the strip about said aperture to form an annular piece and for thereafter forcing the piece over said end of the core to form a flange of the bobbin.

8. A machine for use in the manufacture of bobbins having, in combination, a pair of mandrels spaced apart, arranged in axial alinement and capable when moved toward each other to a predetermined position to enter the ends of a tubular core surrounded by a mass of thread and placed in axial alinement between them so as to center and hold the core and when moved toward each other a predetermined distance from said position to swedge the ends of the core, means for supporting strips of material between the ends of of the core and the mandrels when the mandrels are in retracted position, each strip having an aperture of substantially the diameter of the outside of the core and in axial alinement therewith, means for moving the mandrels toward each other through the apertures in the strips and into position to center and hold the core, and means comprising cutting dies surrounding said mandrels for cutting the strips about said apertures so as to form annular pieces and applying said pieces to the ends of the core.

9. A machine for use in the manufacture of bobbins having, in combination, a pair of centering mandrels spaced apart and arranged in axial alinement, a support movable into and out of position between the mandrels and adapted when positioned between the mandrels to support a cop comprising a tubular core and a mass of thread thereon in axial alinement with said mandrels, means for delivering a tubular core cop to said support when the support is positioned between the mandrels, means for moving the mandrels toward each other to cause their ends to enter the ends of the core so as to center and hold the core, means for retracting said support when the core is thus held, and means for applying suitable pieces of material to the ends of the core to form the flanges of the bobbin while the core is being thus held after said support is retracted.

10. A machine for use in the manufacture of bobbins having, in combination, a pair of centering mandrels spaced apart and arranged in axial alinement, a support movable into and out of position between the mandrels and adapted when positioned between the mandrels to support a cop comprising a tubular core and a mass of thread in axial alinement with said mandrels, a magazine for supporting and guiding a plurality of such cops arranged one above the other, means for delivering one of said cops from the magazine to said support as said support is moved into position between the mandrels, means engaging opposite ends of the core to center the core while it is being held by said support and for holding the core during the retracting movement of the support, means for applying pieces of material to the ends of the core while it is being thus held, and means for imparting said movements to said support.

11. A machine for use in the manufacture of bobbins having, in combination, a support, a magazine for supporting and guiding a plurality of cops each comprising a core and a mass of thread, a support movable into and out of position to receive a cop from the delivery end of said magazine, means for delivering a cop from the magazine to said support as said support is moved into said position, and means for applying pieces of material to the ends of the core of the delivered cop to form the flanges of the bobbin after the cop is delivered to said support.

12. A machine for use in the manufacture of bobbins having, in combination, a magazine for supporting and guiding a column of cops each comprising a core and a mass of thread, a support movable into and out of position to receive a cop from the delivery end of the magazine, means acting upon movement of the support into said position to deliver one of said cops to said support, and upon the retracting movement of said support to hold up the remaining cops in the column, and means for applying pieces of material to the ends of the core of the delivered cop to form the flanges of the bobbin after the cop has been delivered to said support.

13. A machine for use in the manufacture of bobbins having, in combination, a magazine for supporting and guiding cops each comprising a core and thread wound thereon, a support movable into and out of position to receive a cop from the delivery end of the magazine, means for successively delivering said cops from the magazine to said support and connections acting upon movement of said support into said position to move said devices in a direction to deliver a cop from the magazine to said support, and upon the retracting movement of the support to move said device into position to hold up the remaining cops in the column, and means for applying pieces of material to the ends of the core of the delivered cop to form the flanges of the bobbin after the cop has been delivered to said support.

14. A machine for use in the manufacture of bobbins having, in combination, a pair of centering mandrels spaced apart, arranged in axial alinement and movable toward and from each other, a pair of cutting dies concentric with said mandrels, respectively, spaced apart and movable toward and from each other with relation to said mandrels, means for successively delivering cops, each comprising a core and a mass of thread wound thereon, to a position between and in approximate axial alinement with said mandrels and cutting dies, means for supporting and guiding two strips of material between the ends of a core of a cop thus positioned and the ends of the mandrels when the latter are in retracted position, each of said strips having a series of equally spaced apertures, means for intermittently feeding the strips to bring said apertures into approximate axial alinement with said mandrels as the cores are moved into position, respectively, and means acting when a core and an aperture in each strip have been moved into approximate axial alinement with said mandrels to move the mandrels toward each other to cause their ends to enter the ends of the core and then to move said cutting dies toward each other to cut pieces from the strips and apply them to the ends of the cores.

15. A machine for use in the manufacture of bobbins having, in combination, a support for a cop comprising a core and a mass of thread wound thereon, means for feeding the wound core to said support, means for cutting from a continuous perforated strip a perforated disk of material to form a flange for one end of the core, means for forcing said perforated disk over one end of the core and against said mass, and means for swedging said end of the core when the disk is applied so as to hold the disk on the core and against the mass of thread wound thereon.

16. A machine for use in the manufacture of bobbins having, in combination, a support for a cop comprising a core and a mass of thread wound thereon, means for supporting a strip adjacent to one end of the core of the cop held by said support, and means comprising a cutting die for cutting a piece from the strip and applying it to the end of the core to form a flange of the bobbin, said piece having a central aperture and being applied by forcing it over the end of the core.

17. The combination of a support for a strip having equally spaced embossed portions, each of said portions having a central aperture, means comprising a wheel having a series of radial projections for successively entering the apertures in the strip to feed the strip intermittently, each feeding movement being of a distance corresponding to the spacing of said bumped portions, cooperating cutting dies between which the strip is fed for successively cutting out the bumped portions concentrically of their axes as they are positioned between the dies, and means for forcing the annular pieces thus formed over the ends of a core.

18. The combination of a support for a strip having a series of equally spaced embossed portions, each of said portions having a central aperture, means for intermittently feeding the strip to successively bring said bumped portions to a predetermined position, and means for cutting out said bumped portions as they are brought to said position concentrically of the apertures therein, and for forcing the annular pieces thus formed over the ends of a core.

19. A machine for use in the manufacture of bobbins having, in combination, a cutting die and a cooperating cutting punch having its working end face concave, a support for supporting a bobbin core having thread wound thereon on the opposite side of said die from said punch, means for intermittently feeding a strip having equally spaced apertures of substantially the diameter of the outside of said core between the end of said punch and said die so as to successively bring the apertures into axial alinement with said punch, and means for operating said punch as the apertures are successively positioned in axial alinement therewith to cut annular pieces from the strip concentric with said apertures and force them over the end of cores successively held on said support.

MALCOLM CURRY.
ALBERT COOK.
HENRY J. MARX.